United States Patent [19]

Anada et al.

[11] Patent Number: 5,578,659
[45] Date of Patent: Nov. 26, 1996

[54] POLYARYLENE SULFIDE RESIN COMPOSITION

[75] Inventors: Sachio Anada; Nozomu Nakagawa; Kazutomo Tokushige; Toshikatsu Nitoh, all of Shizuoka, Japan

[73] Assignee: Polyplastics Co., Ltd., Osaka, Japan

[21] Appl. No.: 494,242

[22] Filed: Jun. 23, 1995

[30] Foreign Application Priority Data

Jul. 4, 1994 [JP] Japan ................................ 6-152327

[51] Int. Cl.$^6$ ................................................... C08K 7/06
[52] U.S. Cl. ........................... 523/212; 523/213; 524/424; 524/432; 524/433; 524/434; 524/436; 524/609
[58] Field of Search ................................ 523/212, 213; 524/432, 433, 434, 436, 424, 609

[56] References Cited

U.S. PATENT DOCUMENTS

| | | | |
|---|---|---|---|
| 4,917,957 | 4/1990 | Nitoh et al. | 524/262 |
| 4,992,497 | 2/1991 | Wright | 524/262 |
| 5,021,497 | 6/1991 | Ohara et al. | 524/436 |
| 5,149,731 | 9/1992 | Uota et al. | 524/213 |
| 5,177,137 | 1/1993 | Kawashima et al. | 524/609 |
| 5,185,392 | 2/1993 | Nanka et al. | 524/262 |
| 5,234,770 | 8/1993 | Nitoh et al. | 428/419 |
| 5,252,633 | 10/1993 | Ohara et al. | 524/609 |

FOREIGN PATENT DOCUMENTS

| | | |
|---|---|---|
| 364181 | 4/1990 | European Pat. Off. . |
| 2-105857 | 4/1990 | Japan . |

*Primary Examiner*—Mark D. Sweet
*Attorney, Agent, or Firm*—Depaoli & Frenkel, P.C.

[57] ABSTRACT

A polyarylene sulfide resin composition having excellent metal corrosion resistance and excellent mechanical properties is composed of 100 parts by weight of a polyarylene sulfide resin; from 0.1 to 10 parts by weight of a specific metal compound the surface of which has been pretreated with a first alkoxysilane compound; from 0 to 10 parts by weight of a second alkoxysilane compound; and from 5 to 500 parts by weight of an organic filler.

11 Claims, No Drawings

POLYARYLENE SULFIDE RESIN COMPOSITION

FIELD OF THE INVENTION

The present invention relates to an improved polyarylene sulfide composition, more specifically to a polyarylene sulfide composition which has an combined molding proccessability and does not corrode and contaminate metallic parts of metal molds particularly in molding while imparting an improved corrosion resistance to metals in molded parts excellent with metallic materials and providing excellent mechanical properties to the moldings thereof.

DESCRIPTION OF THE RELATED ART

In recent years, thermoplastic resins having high mechanical properties as well as a heat resistance, a chemical resistance and a flame resistance are required to various mechanical parts such as electrical and electronic equipment part materials, automobile equipment part materials, and chemical equipment part materials.

A polyarylene sulfide resin (PAS) represented by polyphenylene sulfide (PPS) is also one of the resins meeting this requirement and has been increasing in the demand in line with a good ratio of physical properties to cost.

However, because this resin has sulfur atoms in the molecular structure thereof and the production raw materials therefor contain sulfur atoms and chlorine atoms, it has the defect that by-products containing lot of sulfur and chlorine are formed in synthesizing the resin, which leads to the difficulty of corroding and contaminating metallic materials of metal molds in molding. Further, the resin has the problem that when it is used as a material for molded parts, the resin corrodes and contaminates metals inserted into the parts, plated metals or deposited metals and causes troubles. Various methods have been proposed as technique for solving this problem, in which scavengers for suppressing the formation of corrosive impurities are added to the PAS resin to attempt the improvement therein. The present inventors have found that blending of at least one selected from zinc carbonate, zinc hydroxide and the double salt of the both, or the mixture thereof as a corrosion inhibitor of the PAS resin against metals with the PAS resin is very effective for preventing a die in molding the PAS resin and metallic materials incorporated into moldings from corrosion and contamination, and it is disclosed in JP-A-2-105857.

However, further investigations have resulted in showing that it is observed that such metal compounds of zinc and the like tend to lower mechanical properties while they are effective for preventing the corrosion of metals, and particularly when inorganic reinforcements such as glass fiber and others and fillers are blended, it is observed that mechanical properties such as mechanical strengths and toughness are reduced, which is supposed to be attributable to the fact that the corrosion inhibitors described above prevent the PAS resin from adhering to the reinforcements and the fillers. This tendency becomes particularly marked when the blending amount of the corrosion inhibitors increase, and the improvement in this point has become an important problem.

DESCRIPTION OF THE INVENTION

In view of such problems, researches energetically continued by the present inventors in order to obtain a PAS resin composition which has a sufficient corrosion resistance against metals of molding dies and does not exert adverse influences on mechanical properties such as tensile strength, impact strength and toughness even when relatively large amounts of corrosion inhibitors are used, that is, combines an excellent metal corrosion resistance with excellent mechanical properties have resulted in confirming that such problems as described above can markedly be improved by employing a composition which is prepared by subjecting a carbonate, a hydroxide or an oxide of a specific metal to surface pretreatment with an alkoxysilane compound and melt-kneading this surface-treated carbonate, hydroxide or oxide of metal together with the PAS resin and other fillers or preferably further adding alkoxysilane compounds, to complete the present invention.

That is, the present invention relates to a polyarylene sulfide resin composition comprising or consisting essentially of:

(A) 100 parts by weight of a polyarylene sulfide, (B) 0.1 to 10 parts by weight of a carbonate, a hydroxide and an oxide of a metal selected from among zinc, magnesium and barium, a mixture thereof, or a double salt thereof, each having been pre-treated in the surface thereof with an alkoxysilane compound, (C) 0 to 10 weight parts of an alkoxysilane compound, and (D) 5 to 500 parts by weight of an inorganic filler.

The components are usually melt-kneaded to prepare the composition.

The structural components of the present invention will be explained below.

The PAS resin as the component (A) used in the present invention is composed mainly of a repetitive unit (—Ar—S—), wherein Ar is an arylene group.

There can be used as the arylene group, for example, a p-phenylene group, a m-phenylene group, an o-phenylene group, a substituted phenylene group, a p,p'-diphenylene sulfone group, a p,p'-biphenylene group, a p,p'-diphenylene ether group, a p,p'-diphenylene carbonyl group, and a naphthalene group.

In this case, a homopolymer comprising the same repetitive unit among the arylene sulfide groups composed of the arylene groups described above can be used or a copolymer containing heterogeneous repetitive units may be used from the viewpoint of the proccessability of the composition.

The most typical as the homopolymer is poly-p-phenylene sulfide (PPS) having a p-phenylene sulfide group as the repetitive unit in which a p-phenylene group is used as the arylene group. Above all, substantially linear polyphenylene sulfide is particularly preferably used.

At least two combinations which are different from each other can be used as the copolymer, wherein an arylene sulfide group comprising the arylene group described above is a principal structure. Among them, the combination in which a p-phenylene sulfide group is a principal structure and which contains the other repetitive units is particularly preferably used. Of them, the polymer containing the p-phenylene sulfide group of 60 mole % or more, more preferably 70 mole % or more is suitable from the viewpoint of physical properties such as a heat resistance, moldability and mechanical properties. In this case, those containing the repetitive units of the components in a block form rather than at random have excellent processabilities and are excellent in a heat resistance and mechanical properties. Accordingly, they can preferably be used. Preferred copolymerizable components include, for example, a m-phenylene group but will not be restricted to this.

The polyarylene sulfide resin used in the present invention is preferably a high molecular weight polymer having a substantially linear structure, which is obtained from a bifunctional monomer by polycondensation, and there can be applied a polymer which is improved in a molding proccessability by raising the melt viscosity of a linear polymer having a relatively low molecular weight by oxidation cross-linking or thermal cross-linking.

Further, there can be used as well the PAS resin having an optional branched or cross-linked structure which is polymerized using in combination a small amount of a monomer having three or more functional groups as a part of the monomers.

Also, the polyarylene sulfide resin used in the present invention may be a modified polyarylene sulfide resin into which various substituents are introduced.

Further, with respect to the PAS component (A) used in the present invention, two or more of the various PAS resins described above are preferably mixed and used in combination in some cases in order to obtain desired characteristics according to purposes. The examples of the particularly preferred combination include, for example, the combined use of two PAS resins having different viscosities from the viewpoint of fluidity or the combined use of a substantially linear PAS resin with a PAS resin having a small amount of an appropriately branched or cross-linked structure and melt viscosities of 2000 to 20000 poise (310° C., a shear rate of 1200 sec$^{-1}$) from the viewpoint of moldability (for example, preventing flush and molding cycle).

Next, the component (B) is obtained by subjecting a carbonate, a hydroxide and an oxide of a metal selected from among zinc, magnesium and barium, a mixture thereof, or a double salt thereof to surface pretreatment with an alkoxysilane compound, for example, obtained by subjecting zinc carbonate, zinc hydroxide, zinc oxide, magnesium carbonate, magnesium hydroxide, magnesium oxide, barium carbonate, barium hydroxide, barium oxide, or a double salt or mixture consisting of two or more of them to surface treatment with an alkoxysilane compound, particularly preferably by subjecting zinc carbonate, zinc hydroxide, and a double salt thereof (for example, basic zinc carbonate mZnCO$_3$·nZn(OH)$_2$) to surface pretreatment with alkoxysilane.

Here, the alkoxysilane compound used for the surface treatment comprises at least one selected from the group consisting of aminoalkoxysilane, epoxyalkoxysilane, mercaptoalkoxysilane, and vinylalkoxysilane.

Aminoalkoxysilane is preferably a silane compound having at least one amino group and two or three alkoxy groups in one molecule and includes, for example, γ-aminopropyltriethoxysilane, γ-aminopropyltrimethoxysilane, γ-amlnopropylmethyldiethoxysilane, γ-aminopropylmethyldimethoxysilane, N-β(aminoethyl)-γ-aminopropyltriethoxysilane, N-β(aminoethyl)-γ-aminopropyltrimethoxysilane, N-β(aminoethyl)-γ-aminopropylmethyldiethoxysilane, N-β(aminoethyl)-γ-aminopropylmethyldimethoxysilane, N-phenyl-γ-aminopropyltriethoxysilane, and N-phenyl-γ-aminopropyltrimethoxysilane.

Epoxyalkoxysilane is preferably a silane compound having at least one epoxy group and two or three alkoxy groups in one molecule and includes, for example, γ-glycidoxypropyltrimethoxysilane, β-(3,4-epoxycyclohexyl)ethyltrimethoxysilane, and γ-glycidoxypropyltriethoxysilane.

Mercaptoalkoxysilane is preferably a silane compound having at least one mercapto group and two or three alkoxy groups in one molecule and includes, for example, γ-mercaptopropyltrimethoxysilane and γ-mercaptopropyltriethoxysilane.

Vinylalkoxysilane is preferably a silane compound having at least one vinyl group and two or three alkoxy groups in one molecule and includes, for example, vinyltriethoxysilane, vinyltrimethoxysilane, and vinyltris(β-methoxyethoxy)silane.

Of the silane compounds described above, epoxyalkoxysilane and aminoalkoxysilane are most preferred in view of the purposes of the present invention.

The amount of the alkoxysilane compound used for such surface treatment does not have to be specifically restricted as long as it is an amount enough to evenly cover the surfaces of the above compounds of metals such as zinc and the like. In general, the amount is 1 to 20 weight %, preferably 2 to 15 weight % based on the compound of metal such as zinc.

The surface treatment may be carried out by a general method. It is carried out, for example, by dipping the above compounds of metals such as zinc in a solution or dispersion of a desired alkoxysilane compound to allow it to be adhered onto the surfaces thereof and drying, but the treating method is not specifically restricted.

The use of the metal compound treated with the alkoxysilane compound described above as the component (B) to cover the surface thereof provides an effect to notably improve a reduction in mechanical properties caused by the presence of the metal compound without exerting any adverse influences on the corrosion-preventing property thereof, and that is the characteristic of the present invention.

From the viewpoint of a corrosion resistance, the lower limit of the component (B) described above is at least 0.1 weight part, preferably 0.3 weight part or more, and particularly preferably 0.5 weight part or more based on 100 weight parts of the PAS resin (A). From the viewpoint of mechanical properties and dispersibility, the upper limit thereof is 10 weight parts or less, preferably 7 weight parts or less, and particularly preferably 5 weight parts or less based on 100 weight parts of the PAS resin (A).

The resin composition of the present invention is preferably further blended with a similar alkoxysilane compound as the component (C) in preparing the resin composition besides using it as a surface treating agent for the component (B) described above. To be concrete, the alkoxysilane compound used as the component (C) is exemplified as well by the same compounds as those described as the surface treating agents for the component (B) described above and may be a compound which is the same as or different from the surface treating agent of the component (B). In particular, aminoalkoxysilane and/or epoxyalkoxysilane are preferred as the component (C), and aminoalkoxysilane is particularly preferred.

The blending amount of the component (C) is 10 weight parts or less, preferably 0.1 to 5 weight parts, and particularly preferably 0.3 to 3 weight parts based on 100 weight parts of the PAS resin (A). This component is effective in terms of mechanical properties but the excess thereof tends to markedly increase the viscosity to cause the gelatinization of the resin and therefore is not preferred.

With respect to the inorganic filler of the component (D) used in the present invention, fibrous, powdery/granular or tabular filler or a mixture thereof is used according to purposes.

The fibrous filler includes inorganic fibrous substances such as glass fiber, asbestos fiber, carbon fiber, silica fiber, silica alumina fiber, zirconia fiber, boron nitride fiber, silicon nitride fiber, boron fiber, potassium titanate fiber, and fibrous substances of metals such as stainless steel, aluminum, titanium, copper, and brass. The particularly typical fibrous filler is glass fiber or carbon fiber.

On the other hand, the powdery/granular filler includes carbon black, graphite, silica, quartz powder, glass beads, glass powder, silicates such as potassium silicate, aluminum silicate, kaolin, talc, clay, diatom earth, and wollastonite, metal oxides such as iron oxide, titanium oxide and alumina, metal carbonates such as calcium carbonate and magnesium carbonate, metal sulfates such as calcium sulfate and barium sulfate, silicon carbide, silicon nitride, boron nitride, and various metal powders.

The tabular filler includes mica, glass flake and various metal foil.

These inorganic fillers can be used singly or in combination of at least two kinds. The combined use of the fibrous filler, particularly glass fiber or carbon fiber with the powdery/granular or tabular filler is a preferable combination in terms of combining a mechanical strength with a dimensional accuracy and electrical properties.

In using these fillers, a convergent agent or a surface treating agent is preferably used if necessary. The examples thereof include functional compounds such as epoxy compounds, isocyanate compounds, silane compounds including alkoxysilanes described above, and titanate compounds, The lower limit of the inorganic fillers as the component (D) is at least 5 weight parts, preferably 10 weight parts or more, and particularly preferably 15 weight parts or more based on 100 weight parts of the PAS resin (A) in terms of rigidity and mechanical properties. The upper limit thereof is 500 weight parts or less, preferably 400 weight parts or less, and particularly preferably 350 weight parts in terms of the preparation of the composition and a molding processability.

The resin composition of the present invention can be prepared by facilities and methods which are used for preparing general synthetic resin compositions. That is, the components (A), (B) and (D) or/and (C) can be blended, melt-kneaded with a uniaxial or biaxial extruder and then extruded to make pellets for molding. Any methods such as a method in which a part or all of the resin components is pulverized, mixed and melt-extruded can be used.

Oxidation inhibitors, heat stabilizers, lubricants, crystalline nucleus agents, UV absorbers, colorants, releasing agents, flame retardants, and other known additives can be added to the composition of the present invention in the range that they do not deviate from the purposes of the present invention.

Further, other thermoplastic resins and organic fillers can be incorporated in combination into the composition of the present invention in an amount of 80 weight parts or less based on 100 weight parts of the PAS resin (A) for the purpose of improving and supplementing various properties thereof. The examples of the thermoplastic resins blended for such purpose can include olefin series polymers or copolymers consisting mainly of polyolefin, such as polyethylene or polypropylene, polyamide series polymers or copolymers such as nylon 6, nylon 66 and others, polyester polymers or copolymers mainly including polyethylene terephthalate and polybutylene terephthalate, liquid crystalline polyester polymers, styrene series polymers such as polystyrene, polystyrene-acrylonitrile and ABS, acrylic series polymers such as polyalkylacrylate, polycarbonate, polyphenylene oxide, polyacetal, polysulfone, polyethersulfone, polyetherimide, polyetherketone, and fluorinated resins. These thermoplastic resins can be used as well in a mixture of two or more kinds.

Examples of the organic fillers include fibrous or powdery/granular polymers having high melting points, such as fluorinated resins and aromatic polyamide.

The PAS resin composition of the present invention is suited to injection molding, extrusion molding, blow molding, vacuum molding, and compression molding.

The PAS resin composition of the present invention has an excellent molding processability and is notably improved in corrosion and contamination to various metals such as iron, copper, zinc, nickel, chromium, cobalt, aluminum, silver, or alloys consisting mainly of them. Accordingly, since the resin composition of the present invention does not corrode or contaminate contact members of molding processing facilities such as dies in molding and metal members used in contact to moldings, the lives of processing facilities and molding parts can be prolonged and moldings having accurate dimensions can be obtained over the extended period of time.

Further, according to the present invention, adverse influences on mechanical properties as was the case with the blend of conventional corrosion inhibitors are markedly improved, and therefore the PAS resin composition combining excellent metal corrosion resistance and mechanical properties can be provided.

EXAMPLES

The present invention will concretely be shown below with reference to Examples but will not be restricted thereto.

Examples 1 to 9 and Comparative Examples 1 to 6

As shown in Table 1, metal compounds (surface treating agents: about 5 weight %) subjected to surface treatment were added as the component (B) to the mixture 100 weight parts of a substantially linear polyphenylene sulfide resin (viscosity: 350 poise at 310° C. and 1200 sec$^{-1}$) and a branched polyphenylene sulfide resin (viscosity: 8000 poise at 310° C. and 1200 sec$^{-1}$) of about 10 weight % as the component (A), and the components were mixed with a blender for two minutes.

Further, glass fiber was added as the component (D) and mixed with the blender for 30 seconds. Then, this mixture was melt-kneaded with an extruder having a cylinder temperature of 310° C. to make the pellets of the polyphenylene sulfide resin composition (Table 1).

For comparison, a resin composition containing no component (B) and a resin composition in which surface treatment was not carried out with an alkoxysilane compound were similarly melt-kneaded and extruded to make the pellets of the compositions (Table 2).

The evaluation results are shown in Table 1 (Examples) and Table 2 (Comparative Examples), respectively.

Evaluating methods are as follows:
Corrosion Resistance

The above pellets of 22 g were put into the bottom of a test tube having a inner diameter of 30 mm and a height of 150 mm, and the plate of stainless steel (SUS-304) cut to a size of 2 mm×12 mm was suspended so that the metal plate was positioned at a height of about 60 mm from the uppermost part of the pellets. The upper part of the test tube was stoppered, and after maintaining 310° C. for 5 hours, the metal plate was taken out and observed visually and under a microscope to check a corrosive state. Relative rating was given as shown below according to the degree of the corrosive state:

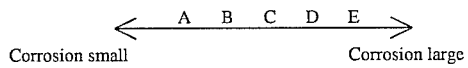

Corrosion small → Corrosion large

Tensile Strength and Tensile Elongation

Tensile strength and tensile elongation were measured with an injection molding machine at a cylinder temperature of 320° C. and a die temperature of 150° C. according to ASTM D-638.

Examples 10 to 19 and Comparative Examples 7 to 8

The resin compositions prepared by further blending an alkoxysilane compound as the component (C) into the resin compositions prepared in the Examples and Comparative Examples described above were similarly evaluated. The results are shown in Table 3.

Examples 20 to 23 and Comparatives to 9 to 11

Pellets were prepared changing the kind and amounts of the inorganic fillers (D) and similarly evaluated. The results are shown in Table 4.

Examples 24 to 27 and Comparative Examples 12 to 13

The results obtained by changing the kind of the metals used for the corrosion resistance test to compare the corrosion resistance are shown in Table 5.

TABLE 1

|  | \multicolumn{9}{c}{Example} |
|---|---|---|---|---|---|---|---|---|---|
|  | 1 | 2 | 3 | 4 | 5 | 6 | 7 | 8 | 9 |
| Composition |  |  |  |  |  |  |  |  |  |
| (A) PPS (parts by weight) | 100 | 100 | 100 | 100 | 100 | 100 | 100 | 100 | 100 |
| (B) Metal compounds (Note 1) | B-1 | B-1 | B-1 | B-1 | B-2 | B-2 | B-3 | B-4 | B-5 |
| Surface treating agent (Note 2) | a | a | a | b | a | b | a | a | a |
| (parts by weight) | 0.5 | 1.0 | 5.0 | 1.0 | 1.0 | 1.0 | 1.0 | 1.0 | 1.0 |
| (D) Glass fiber (parts by weight) | 70 | 70 | 70 | 70 | 70 | 70 | 70 | 70 | 70 |
| Evaluation |  |  |  |  |  |  |  |  |  |
| Corrosion resistance | B | A | A | A | A | A | A | B | B |
| Tensile strength (kg/cm$^2$) | 1800 | 1750 | 1570 | 1720 | 1680 | 1670 | 1640 | 1620 | 1630 |
| Tensile elongation (%) | 1.8 | 1.7 | 1.4 | 1.6 | 1.5 | 1.5 | 1.5 | 1.4 | 1.4 |

Note 1
B-1: $2ZnCO_3 \cdot 3Zn(OH)_2$
B-2: $ZnCO_3$
B-3: $Zn(OH)_2$
B-4: $MgCO_3$
B-5: $MgO$
Note 2
a: γ-glycidoxypropyltriethoxysilane
b: γ-aminopropyltriethoxysilane
c: γ-mercaptopropyltrimethoxysilane
(These are the same in the following Tables.)

TABLE 2

|  | \multicolumn{6}{c}{Comp. Example} |
|---|---|---|---|---|---|---|
|  | 1 | 2 | 3 | 4 | 5 | 6 |
| Composition |  |  |  |  |  |  |
| (A) PPS (parts by weight) | 100 | 100 | 100 | 100 | 100 | 100 |
| (B) Metal compounds (Note 1) | none | B-1 | B-2 | B-3 | B-4 | B-5 |
| Surface treating agent (Note 2) |  | none | none | none | none | none |
| (parts by weight) |  | 1.0 | 1.0 | 1.0 | 1.0 | 1.0 |
| (D) Glass fiber (parts by weight) | 70 | 70 | 70 | 70 | 70 | 70 |
| Evaluation |  |  |  |  |  |  |
| Corrosion resistance | E | A | A | A | B | B |
| Tensile strength (kg/cm$^2$) | 1820 | 1630 | 1570 | 1500 | 1490 | 1510 |
| Tensile elongation (%) | 1.7 | 1.4 | 1.3 | 1.3 | 1.3 | 1.3 |

TABLE 3

|  | Example |  |  |  |  |  |  |  |  |  | Comp. Example |  |
|---|---|---|---|---|---|---|---|---|---|---|---|---|
|  | 10 | 11 | 12 | 13 | 14 | 15 | 16 | 17 | 18 | 19 | 7 | 8 |
| Composition |  |  |  |  |  |  |  |  |  |  |  |  |
| (A) PPS (parts by weight) | 100 | 100 | 100 | 100 | 100 | 100 | 100 | 100 | 100 | 100 | 100 | 100 |
| (B) Metal compounds (Note 1) | B-1 | B-1 | B-1 | B-1 | B-1 | B-1 | B-2 | B-3 | B-4 | B-5 | none | B-1 |
| Surface treating agent (Note 2) | a | a | a | a | a | b | a | a | a | a |  | — |
| (parts by weight) | 1.0 | 1.0 | 1.0 | 1.0 | 1.0 | 1.0 | 1.0 | 1.0 | 1.0 | 1.0 | — | 1.0 |
| (C) Alkoxysilane (Note 2) | b | b | b | a | c | b | b | b | b | b | b | b |
| (parts by weight) | 0.5 | 1.0 | 2.0 | 1.0 | 1.0 | 1.0 | 1.0 | 1.0 | 1.0 | 1.0 | 1.0 | 1.0 |
| (D) Glass fiber (parts by weight) | 70 | 70 | 70 | 70 | 70 | 70 | 70 | 70 | 70 | 70 | 70 | 70 |
| Evaluation |  |  |  |  |  |  |  |  |  |  |  |  |
| Corrosion resistance | A | A | A | A | A | A | A | A | B | B | E | A |
| Tensile strength (kg/cm$^2$) | 1820 | 1900 | 2010 | 1870 | 1820 | 1850 | 1810 | 1820 | 1830 | 1800 | 1950 | 1690 |
| Tensile elongation (%) | 1.7 | 1.9 | 2.1 | 1.8 | 1.8 | 1.8 | 1.7 | 1.8 | 1.7 | 1.7 | 2.0 | 1.5 |

TABLE 4

|  | Example |  |  |  | Comp. Example |  |  |
|---|---|---|---|---|---|---|---|
|  | 20 | 21 | 22 | 23 | 9 | 10 | 11 |
| Composition |  |  |  |  |  |  |  |
| (A) PPS (parts by weight) | 100 | 100 | 100 | 100 | 100 | 100 | 100 |
| (B) Metal compounds (Note 1) | B-1 | B-1 | B-1 | B-1 | B-1 | B-1 | B-1 |
| Surface treating agent (Note 2) | a | a | a | a | none | none | none |
| (parts by weight) | 1.0 | 1.0 | 1.0 | 1.0 | 1.0 | 1.0 | 1.0 |
| (C) Alkoxysilane (Note 2) | b | b | none | b | none | none | none |
| (parts by weight) | 1.0 | 1.0 |  | 1.0 |  |  |  |
| (D) Glass fiber (parts by weight) | 20 | 100 | 100 | 100 | 20 | 100 | 100 |
| Calcium carbonate (parts by weight) | — | — | 100 | 100 | — | — | 100 |
| Evaluation |  |  |  |  |  |  |  |
| Corrosion resistance | A | A | A | A | A | A | A |
| Tensile strength (kg/cm$^2$) | 1210 | 1950 | 1530 | 1663 | 1110 | 1710 | 1410 |
| Tensile elongation (%) | 2.5 | 1.7 | 1.2 | 1.4 | 2.0 | 1.3 | 1.0 |

TABLE 5

|  | Used resin |  |  |  |  |  |
|---|---|---|---|---|---|---|
|  | Example |  |  |  | Comp. Example |  |
|  | 24 | 25 | 26 | 27 | 12 | 13 |
| Kind of metals | Ex. 1 | Ex. 2 | Ex. 15 | Ex. 16 | Comp. Ex. 1 | Comp. Ex. 7 |
| SKD-11 | A | A | A | A | E | D |
| Silver | B | A | A | A | E | E |
| Copper | B | A | B | B | E | E |

What we claim is:

1. A polyarylene sulfide resin composition which has excellent metal corrosion resistance, comprising:

(A) 100 parts by weight of a polyarylene sulfide resin, (B) 0.1 to 1.0 part by weight of (i) a carbonate, a hydroxide or an oxide of a metal selected from zinc and barium, and barium, (ii) a magnesium hydroxide, (iii) a magnesium oxide, (iv) a mixture thereof, or (v) a double salt thereof, each of (i)–(v) having been pretreated in a surface thereof with a first alkoxysilane compound, (C) 0 to 10 parts by weight of a second alkoxysilane compound, and (D) 5 to 500 parts by weight of an inorganic filler.

2. The composition as claimed in claim 1, wherein the component (A) is a polyarylene sulfide resin having at least 70 mol % of p-phenylene sulfide groups.

3. The composition as claimed in claim 1 wherein the component (A) is a substantially linear polyarylene sulfide resin.

4. The composition as claimed in claim 1, wherein the component (A) is a mixture of a substantially linear polyarylene sulfide resin with a polyarylene sulfide resin having a branched or crosslinked structure and a melt viscosity of 2,000 to 20,000 P.

5. The composition as claimed in claim 1, wherein the component (B) is zinc carbonate, zinc hydroxide, a double salt of both (basic zinc carbonate) or a mixture thereof, each subjected to surface pretreatment with the first alkoxysilane compound.

6. The composition as claimed in claim 1, wherein said first alkoxysilane compound used in said surface pretreatment of the component (B) is an aminoalkoxysilane and/or an epoxyalkoxysilane.

7. The composition as claimed in claim 1, wherein the component (C) is 0.1 to 5 parts by weight of an aminoalkoxysilane and/or an epoxyalkoxysilane.

8. The composition as claimed in claim 1, wherein the component (D) is a glass fiber or a carbon fiber.

9. The composition as claimed in claim 1, wherein the component (D) is a mixture of a fibrous filler with a powdery or platy filler.

10. A polyarylene sulfide resin composition having excellent metal corrosion resistance and comprising:

(A) 100 parts by weight of a polyarylene sulfide resin, (B) 0.1 to 10 parts by weight of a surface-treated metal component consisting of zinc carbonate, zinc hydroxide, zinc oxide, barium carbonate, barium oxide, magnesium oxide, a mixture of the foregoing or a double-salt of the foregoing, said metal component having been surface-treated with a first alkoxysilane compound, (C) 0 to 10 parts by weight of a second alkoxysilane compound, and (D) 5 to 500 parts by weight of an inorganic filler.

11. The composition of claim 10, wherein said composition comprises 0.1 to less than 5 parts by weight of said surface-treated metal component.

* * * * *